(12) United States Patent
Watanabe

(10) Patent No.: US 6,593,966 B1
(45) Date of Patent: Jul. 15, 2003

(54) PREVENTION OF NOISE BEING SUPERPOSED ON VIDEO SIGNAL IN IMAGE PICKUP APPARATUS

(75) Inventor: Tohru Watanabe, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/114,555

(22) Filed: Jul. 13, 1998

(30) Foreign Application Priority Data

Jul. 15, 1997 (JP) ............................................. 9-189999

(51) Int. Cl.[7] .......................... H04N 5/335; H04N 5/228
(52) U.S. Cl. ..................... 348/312; 348/324; 348/222.1
(58) Field of Search ................................. 348/311, 317, 348/320, 322, 324, 312, 222, 222.1

(56) References Cited

U.S. PATENT DOCUMENTS

| 5,043,821 | A | * | 8/1991 | Suga et al. | .................. 348/320 |
| 5,258,834 | A | * | 11/1993 | Tsuji et al. | .................. 348/222 |
| 5,382,975 | A | * | 1/1995 | Sakai et al. | .................. 348/241 |
| 5,450,129 | A | * | 9/1995 | Matoba et al. | .............. 348/312 |
| 5,471,243 | A | * | 11/1995 | Suzuki et al. | ............... 348/234 |
| 5,663,759 | A | * | 9/1997 | Horng et al. | ................ 348/222 |
| 5,920,343 | A | * | 7/1999 | Watanabe et al. | ........... 348/222 |
| 5,926,219 | A | * | 7/1999 | Shimizu et al. | ............. 348/222 |
| 6,288,744 | B1 | * | 9/2001 | Takahashi et al. | .......... 348/311 |

FOREIGN PATENT DOCUMENTS

JP          7087404          3/1995 .......... H04N/5/335

\* cited by examiner

*Primary Examiner*—Wendy R. Garber
*Assistant Examiner*—Lin Ye
(74) *Attorney, Agent, or Firm*—Hogan & Hartson, LLP

(57) ABSTRACT

Video information can be taken from an image pickup apparatus at a desired frequency. A first timing control circuit operates in synchronization with the operation of a drive circuit to control the operation of an analog processing circuit and an A/D converter and writing of video data $D1(n)$ into a line memory. A second timing control circuit controls to read the video data $D1(n)$ from the line memory and to operate a digital processing circuit. A CCD operates intermittently in a horizontal scanning cycle, and while it is operating, the analog processing by the analog processing circuit and the quantizing processing by the A/D conversion circuit are performed. While the CCD is not operating, the digital processing by the digital processing circuit is conducted to output video data $D2(n)$.

2 Claims, 3 Drawing Sheets

PREVENTION OF NOISE BEING SUPERPOSED ON VIDEO SIGNAL IN IMAGE PICKUP APPARATUS

BACKGROUND OF THE INVENTION a) Field of the Invention

The present invention relates to an image pickup apparatus, which prevents noise, caused in a signal processing step, from affecting a video signal.

b) Description of the Related Art

It is well known to use an image scanner, which scans to read subject written material, to take image data into a computer or the like. Lately, it has been studied to use an electronic still camera which can be used to take pictures of a three-dimensional subject. The electronic still camera comprises, for example, a CCD image sensor and its drive circuit, wherein a drive circuit responds to an instruction given by a computer and outputs information charges to be accumulated in a light reception part of the CCD image sensor to obtain a video signal corresponding to the object image.

FIG. 5 is a block diagram showing the structure of a conventional electronic still camera. FIG. 6 is a diagram showing waveforms of a drive clock for driving a conventional electronic still camera.

A CCD image sensor 1 of a frame transfer method has a light reception part i, a storage part s, a horizontal transfer part h and an output part d. The light reception part i comprises a plurality of shift registers which are arranged continuously in a perpendicular direction and parallel to one another. Respective bits of these shift registers are potentially divided by the action of an electrode to define a plurality of light reception pixels. Thus, the information charges are accumulated in the respective bits of the shift register, namely the light reception pixels, according to the object image irradiated to the light reception part i by an optical system. The storage part s comprises a plurality of shift registers which are connected to the respective shift registers constituting the light reception part i and receives accumulated information charges from the shift registers of the light reception part i. The horizontal transfer part h comprises a single shift register where each bit is related to the output end of the shift registers of the storage part s and outputs so as to sequentially transfer the information charges received on a horizontal line basis from the storage part s. The output part d is disposed on the output side of the horizontal transfer part h and converts the information charges output from the horizontal transfer part h into a voltage value on a pixel basis, for output as a video signal y0($t$).

An analog processing circuit 2 performs processing, such as sample and hold or level clamp, of a video signal y0($t$) which is input from the CCD 1 to produce a video signal y1($t$) conforming to a predetermined format. For example, in the sample-and-hold processing, only a signal level is taken out of the video signal y0($t$) which has a reset level and a signal level alternately repeated in synchronization with the operation of the output part d of the CCD 1. In the level-clamp processing, a black reference level determined at the end of a horizontal scanning period of the video signal y0($t$) is clamped to a predetermined level for every horizontal scanning period.

An A/D conversion circuit 3 quantizes the video signal y1($t$) input from the analog processing circuit 2 at a timing according to the operation of the analog processing circuit 2, namely the output operation of the CCD 1, and produces video data D1($n$) which indicates, in a digital value, information corresponding to the individual light reception pixel of the light reception part i. A digital processing circuit 4 performs processing such as color separation and matrix operation of video data D1($n$) input from the A/D conversion circuit 3 to produce video data D2($n$) containing luminance information and color difference information. For example, the color separation process divides video data D1($n$) according to a color arrangement of a color filter fitted to the light reception part i of the CCD 1 to produce multiple items of color component information. The matrix operation process synthesizes the divided color components to produce luminance information and also picks up luminance information from the individual color component information to produce color difference information. Video data D2($n$) output from the digital processing circuit 4 is supplied to a computer in conformity with a given output format.

In response to various timing signals from the timing control circuit 6, the drive circuit 5 supplies polyphase drive clocks to each part of the CCD 1. For example, the drive circuit 5 supplies quadrature phase transfer clocks $\phi v$, $\phi s$ to the light reception part i and the storage part s and binary transfer clock $\phi h$ to the horizontal transfer part h. A vertical transfer clock $\phi v$ has a discharge pulse for discharging all information charges accumulated in the light reception part i and a read-out pulse for transferring information charges for a single screen of the light reception part i as shown in FIG. 6. A storage transfer clock $\phi s$ has a read-in pulse corresponding to a read-out pulse of the vertical transfer clock $\phi v$ and a line-spacing pulse for transferring information charges of the storage part s to the horizontal transfer part h for every horizontal line. The horizontal transfer clock $\phi h$ has an output pulse for transferring an information charge for a single line of the horizontal transfer part h to the output part d. Thus, the information charges accumulated in the light reception part i during a period from the end of the discharge pulse to the start of the read-out pulse are transferred from the light reception part 1 to the storage part s for temporary storage, and output for transfer in a single line unit from the storage part s via the horizontal transfer part h.

In response to an image-pickup instruction P and a transfer instruction T supplied from the computer, the timing control circuit 6 produces timing signals RT, VT, HT to designate timing of each transfer drive conducted by the CCD 1 and supplies them to the drive circuit 5. At the same time, a reference clock CK is supplied to the analog processing circuit 2, the A/D conversion circuit 3 and the digital processing circuit 4 to synchronize the operation of the individual circuit with the output operation of the CCD 1. The discharge timing signal RT, responding to the image-pickup instruction P, gives an instruction to the drive circuit 5 to produce a discharge pulse of a vertical transfer clock $\phi v$. The vertical transfer timing signal VT is delayed for an exposure period with respect to the discharge timing signal RT and gives an instruction to the drive circuit 5 to produce a discharge pulse of the vertical transfer clock $\phi v$ and a read-in pulse of the storage transfer clock $\phi s$. In response to the transfer instruction T, the horizontal transfer timing signal HT gives an instruction to the drive circuit 5 to produce a line-spacing pulse of a storage transfer clock $\phi s$ and an output pulse of a horizontal transfer clock $\phi h$. The horizontal transfer timing signal HT is configured so that a single line-spacing pulse and an output pulse are produced by a single trigger or a plurality of line-spacing pulses and output pulses are produced at an equal interval by a single trigger.

With such an electronic still camera, a desired object image is taken in response to the image-pickup instruction P, and video data D2(n) showing the object image is output in response to the transfer instruction T.

Where video data is taken into a computer through an electronic still camera, the computer's internal processing is temporarily stopped so as to allow input of the video data. If video data having a large information quantity is continuously entered into the computer for a single screen, it takes a longer time to stop the internal processing. Therefore, video data is generally entered in a single line unit in conformity with the processing capacity of each part of the computer. An image pickup apparatus adopting such an input method is disclosed in Japanese Patent Application No. Hei 5-225801 (Japanese Patent Laid-Open Publication No. Hei 7-87404) filed by the same applicant.

An ordinary computer has a predetermined transfer frequency for input of video data. This frequency does not always agree with an output frequency of video data from an electronic still camera. Therefore, a video memory is disposed at the output part of the electronic still camera so as to read the video data, which is temporarily stored in the video memory, at a frequency conforming to the transfer frequency of the computer.

When the drive frequency of the CCD 1 is different from the output frequency of the video data D2(n), the electronic still camera as described above has low-frequency noise due to a difference of the mutual frequencies mixed into a video signal y0(t), resulting in a problem that the noise appears as vertical stripes on a reproduced screen. Namely, since two types of clocks having a different frequency are used in the camera, a difference in timing between the respective parts according to the respective clocks causes potential variation in a power line or a ground line, and a noise component is superimposed upon the video signal y0(t) at the output part d of the CCD 1 or in the analog processing circuit 2. Particularly where a processing system of the analog processing circuit 2 or the digital processing circuit 4 is integrated with a control system of the timing control circuit 6 or the like into a single chip, low-frequency noise due to a difference in operation frequency has a significant influence.

Accordingly, it is an object of the present invention to provide an electronic still camera (image pickup apparatus) which can supply video information efficiently to a computer without superimposing noise upon the video signal.

SUMMARY OF THE INVENTION

The present invention has been achieved to remedy the above-described disadvantages and is characterized by having a solid-state image pickup device, which has a plurality of light reception pixels disposed in a matrix to accumulate information charges corresponding to object images to be irradiated onto the respective light reception pixels; a drive circuit, which transfers the information charges accumulated on the respective light reception pixels of the solid-state image pickup device into a storage area adjacent to the light reception pixels and outputs the information charges for each horizontal line to transfer them from the storage area to output video signals which are continuous in a horizontal line unit; an analog processing circuit, which performs signal processing of the video signals to produce processed video signals; an A/D conversion circuit, which quantizes the processed video signals to produce video data corresponding to the respective light reception pixels of the solid-state image pickup device; a line memory, which stores the video data in a single horizontal line unit; and a digital processing circuit which performs signal processing of the video data read from the line memory to produce processed video data, wherein the operation of the analog processing circuit and the A/D conversion circuit is synchronized with the operation of the drive circuit, the drive circuit and the analog processing circuit are operated in a predetermined period at the beginning of a horizontal scanning period, and the digital processing circuit is operated during the remainder of the horizontal scanning period after completion of operations of said drive circuit and said analog processing circuit.

According to the invention, the analog processing circuit and the A/D conversion circuit synchronized with the drive circuit and the digital processing circuit which is asynchronous with these circuits operate in time division within each horizontal scanning period. Therefore, no circuit operates at a different frequency while the solid-state image pickup device is outputting, and it is difficult for noise to be superimposed upon the video signal to be output from the solid-state image pickup device.

The invention can operate the drive system of the solid-state image pickup apparatus and the output system of video information at a particular frequency. Accordingly, a transfer frequency of the video data obtained from the image pickup apparatus can be selected freely regardless of the drive frequency of the image pickup device built into the apparatus.

DETAILED DESCRIPTION OF THE PREFERRED EMBODIMENTS

Figure 1:
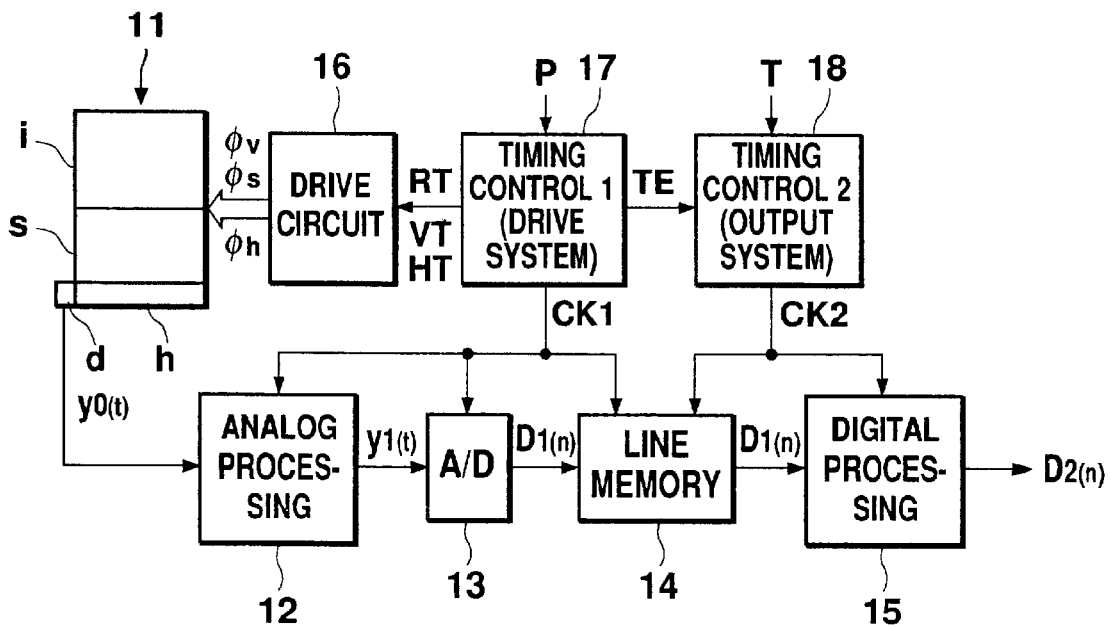
FIG. 1 is a block diagram showing the structure of an image pickup apparatus according to the invention.
Figure 2:
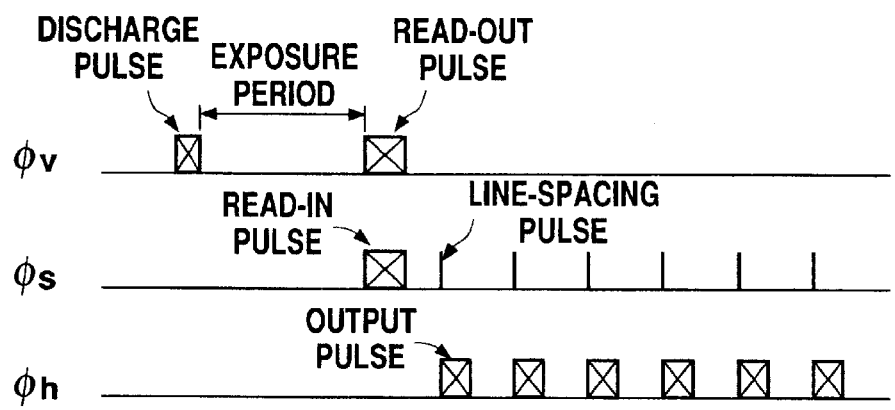
FIG. 2 is a diagram showing waveforms of a clock for driving the image pickup apparatus of the invention.

FIG. 1 is a block diagram showing the structure of an electronic still camera as the image pickup apparatus according to the invention. FIG. 2 is a diagram showing waveforms of a drive clock for operating the electronic still camera.

Figure 5:
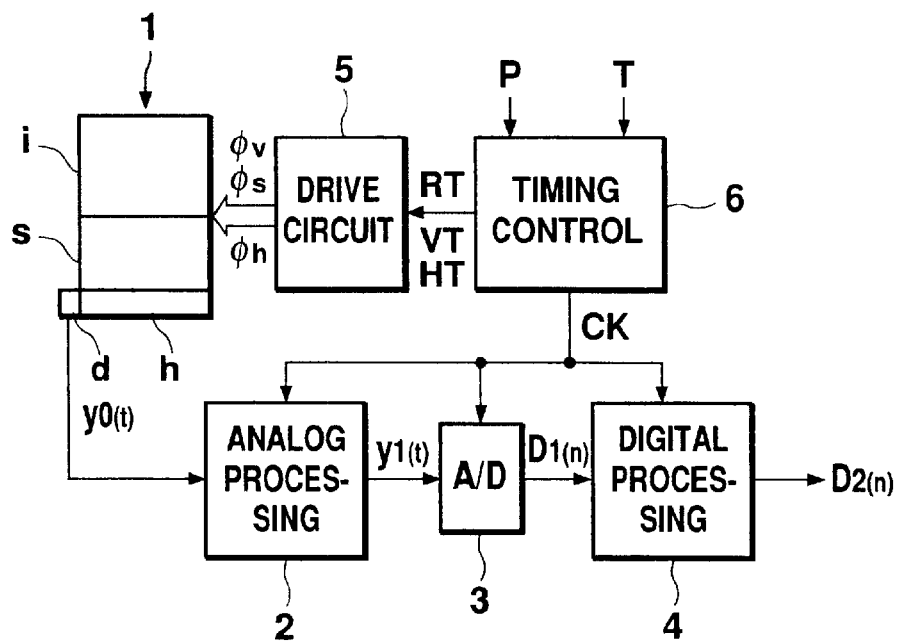
FIG. 5 is a block diagram showing the structure of a conventional solid-state image pickup device.

A CCD image sensor 11 is the same as the CCD 1 shown in FIG. 5 and transfers to a storage part s information charges for a single screen to be accumulated in a light reception part i and outputs the information charges for every horizontal line through a horizontal transfer part h to output a video signal y0(t).

An analog processing circuit 12 performs processing, such as sample and hold or level clamp, of the video signal y0(t) input from the CCD 11 to produce a video signal y1(t) in conformity with a predetermined format. The processing performed by the analog processing circuit 12 is the same as that performed by the analog processing circuit 2 shown in FIG. 5. An A/D conversion circuit 13 quantizes the video signal y1(t) input from the analog processing circuit 12 at a timing in accordance with the output operation of the analog processing circuit 12 to produce image data D1(n) which represents, in a digital value, information corresponding to each light reception pixel of the light reception part i of the CCD 11. A line memory 14 has a capacity capable of storing the video data D1($n$) for lines in an appropriate quantity and sequentially reads and stores the video data D1($n$) produced by the A/D conversion circuit 13. A digital processing circuit 15 performs processing, such as color separation and matrix operation, of the video data D1($n$) read from the line memory 14 to produce video data D2($n$) containing luminance information and color difference information. The digital processing circuit 15 performs the same processing as in the digital processing circuit 4 shown in FIG. 5.

Figure 6:
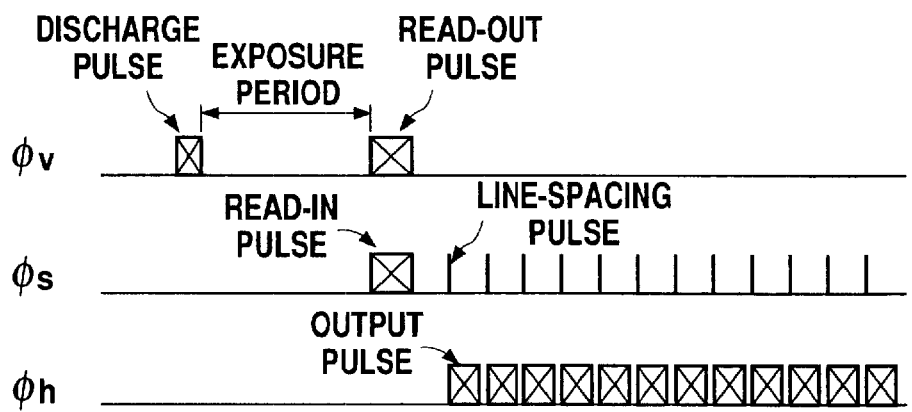
FIG. 6 is a diagram showing waveforms of a clock for driving a conventional image pickup apparatus.

A drive circuit 16 responds to various timing signals from a first timing control circuit 17 and supplies each part of the CCD 11 with polyphase drive clocks. A vertical transfer clock φv supplied to the light reception part i of the CCD 11 is the same as the vertical transfer clock φv shown in FIG. 6 and has a discharge pulse and a read-out pulse to determine an exposure time in the period between these pulses. A storage transfer clock φs supplied to the storage part s has a read-in pulse and a line-spacing pulse corresponding to a read-out pulse of the vertical transfer clock φv. Also, a horizontal transfer clock φh supplied to the horizontal transfer part h has an output pulse corresponding to the line-spacing pulse. The output pulse is set to have a frequency so that all information charges for a single line can be output from the horizontal transfer part h in a period (e.g., the first half period) shorter than a cycle of producing the line-spacing pulse. Specifically, compared with the storage transfer clock φs and the horizontal transfer clock φh shown in FIG. 6, when the output pulse has the same frequency, the line-spacing pulse is set to have a longer cycle, while when the line-spacing pulse has the same cycle, the output pulse is set to have a higher frequency. Generally, the frequency of the output pulse is determined according to the reference operation frequency of each circuit, and the line-spacing pulse is determined to have a cycle in accordance with the frequency of the output pulse. By the transfer clock described above, CCD output (video signal y0($t$)) for outputting video information for one line can be obtained within a predetermined period from the start of the horizontal scanning period (one cycle of the line-spacing pulse).

A first timing control circuit 17 responds to an image pickup instruction P, produces timing signals RT, VT, HT for designating timing of each transfer drive of the CCD 11, and supplies them to the drive circuit 16. At the same time, a first reference clock CK1 is supplied to the analog processing circuit 12, the A/D conversion circuit 13 and the line memory 14 to synchronize the operation of the analog processing circuit 12 and the A/D conversion circuit 13 and the write-in operation of the line memory 14 with the output operation of the CCD 11. Furthermore, a timing signal TE indicating the completion of the transfer output of the information charges for one line is supplied to a second timing control circuit 18.

The discharge timing signal RT responds to the image pickup instruction P and gives an instruction to the drive circuit 5 to produce a discharge pulse with the vertical transfer clock φv. The vertical transfer timing signal VT is delayed by a desired exposure period compared with the discharge timing signal RT and gives an instruction to the drive circuit 5 to produce a discharge pulse with the vertical transfer clock φv and a read-in pulse with the storage transfer clock φs. A delay of the vertical transfer timing signal VT, namely a length of the exposure period, compared with the discharge timing signal RT is set to accommodate an average level of the video signal y0($t$) in a predetermined range. The horizontal transfer timing signal HT is in succession to the vertical transfer timing signal VT and gives an instruction to the drive circuit 5 to produce a line-spacing pulse with a storage transfer clock φs and an output pulse with a horizontal transfer clock φh. The production of the line-spacing pulse and the output pulse causes output of information charges for one line from the horizontal transfer part h of the CCD 11, thereby obtaining a video signal y0($t$). The video signal y0($t$) is processed in various ways by the analog processing circuit 12 and further quantized by the A/D conversion circuit 13. Video data D1($n$) thus obtained is temporarily written into the line memory 14.

In response to the transfer instruction T, the second timing control circuit 18 supplies the line memory 14 and the digital processing circuit 15 with a second reference clock CK2. The second reference clock CK2 agrees with a transfer frequency of a computer which receives the video data D2($n$) from the digital processing circuit 15 and is asynchronous with the first reference clock CK1. Furthermore, the second reference clock CK2 is started to be supplied, upon completion of the transfer output of the information charges for one horizontal line from the CCD 11 during the individual horizontal scanning period, in accordance with a transfer completion timing signal TE supplied from the first timing control circuit 17. Thus, the digital processing circuit 15 stops operating at the timing according to the second reference clock while the CCD 11 is operating to output, thereby preventing noise from being produced due to a difference of frequency between the first reference clock CK1 and the second reference clock CK2.

Figure 3:
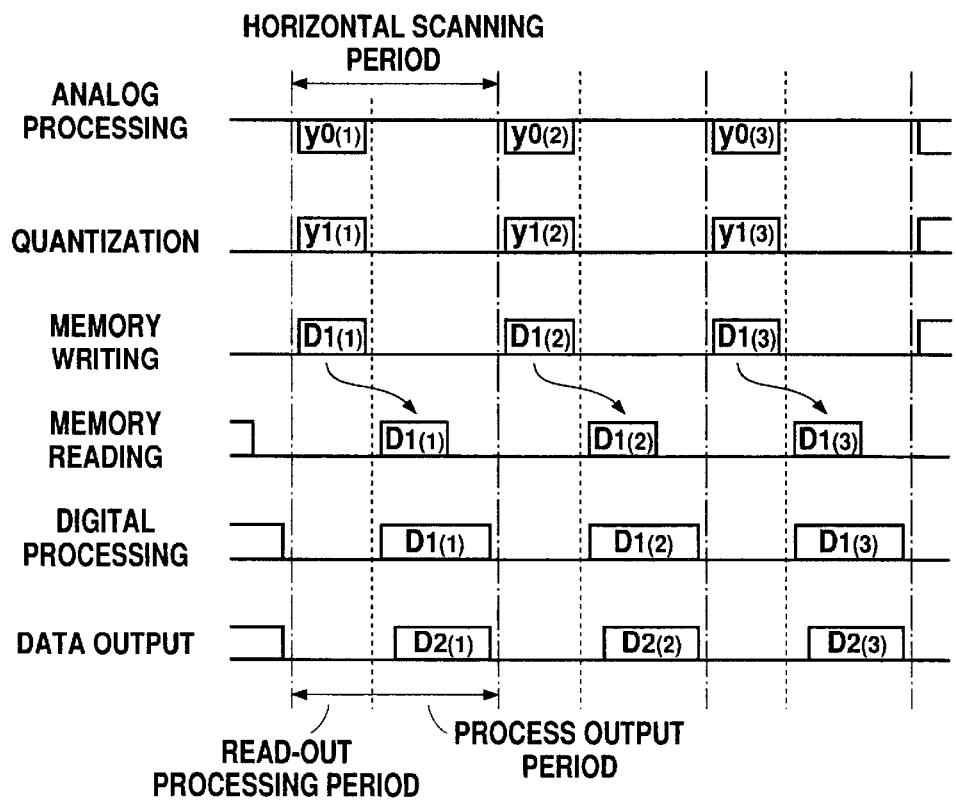
FIG. 3 is a timing chart showing the operation of the image pickup apparatus.

FIG. 3 is a timing chart showing the operation timing of respective circuits of a signal processing system.

The analog processing of the video data y0($t$), the quantizing processing of the video data y1($t$) and the writing of the video data D1($n$) are completed within a predetermined period from the start of the individual horizontal scanning period. Such timing is synchronous with the operation timing of the horizontal transfer part h and the output part d of the CCD 11. In other words, the line-spacing pulse of the storage transfer clock φs has a cycle of a single horizontal scanning period, and a portion of the start of its horizontal scanning period is set to a read-out processing period, in which the analog processing circuit 12, the A/D conversion circuit 13 and the line memory 14 operate at such a timing that they are mutually synchronized. Reading of the video data D1($n$), the digital processing of the video data D1($n$) and the output of the video data D2($n$) are started during the horizontal scanning period but after the completion of the processing operation of the analog processing circuit 12, and completed by the end of the horizontal scanning period. In other words, the processing output period is set within the individual horizontal scanning period excluding the read-out processing period, and within the processing output period, the line memory 14 and the digital processing circuit 15 operate at such a timing that they are mutually synchronized. Such timing is synchronous with the capturing operation of a computer which receives the video data D2($n$), and basically is not synchronized with the output operation of the CCD 11.

As described above, the individual horizontal scanning period is divided into the read-out processing period and the processing output period, and the drive of the CCD 11 and the output of the video data D2($n$) are independently performed in the individual period. Therefore, each frequency can be set freely.

Figure 4:
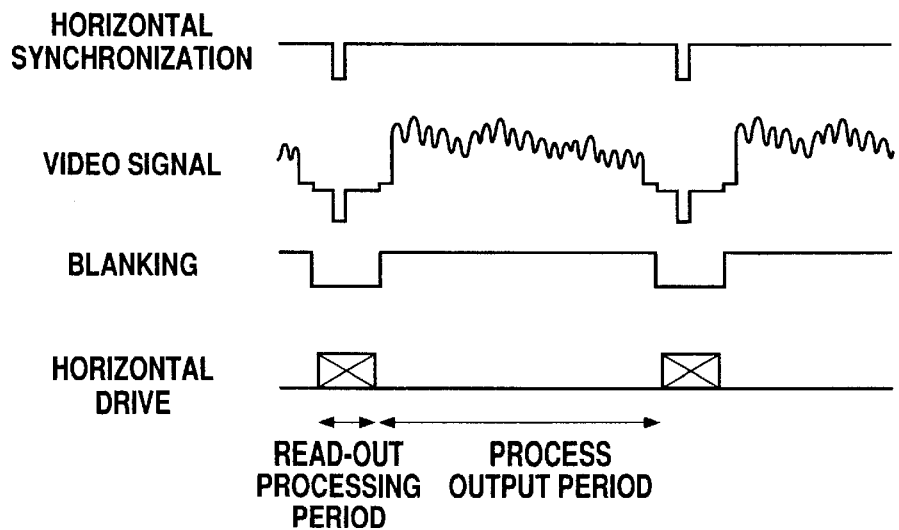
FIG. 4 is a diagram showing waveforms of a video signal indicating animation.

In the above-described embodiment, a still image was captured for reference. It is to be understood that animation can also be captured by setting the CCD 11 to have a higher operation frequency to complete outputting the information charges for a single line within the blanking period of the horizontal scanning. Namely, a video signal for showing animation is set to have a blanking period containing a synchronization signal or the like by separators in the horizontal scanning period as shown in FIG. 4. Also, by setting the read-out processing period so to fall in the blanking period, the video data can be transferred at a desired frequency without any superimposing of noise in the same manner as in capturing the still image.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. An image pickup apparatus comprising;
   a solid-state image pickup device, which has a plurality of light reception pixels disposed in a matrix to accumulate information charges corresponding to object images to be irradiated onto the respective light reception pixels;
   a drive circuit, which transfers the information charges accumulated on the respective light reception pixels of said solid-state image pickup device into a storage area adjacent to the light reception pixels and outputs the information charges for each horizontal line to transfer the information charges from the storage area to output video signals which are continuous in a horizontal line unit;
   an analog processing circuit, which performs signal processing of the video signals to produce processed video signals;
   an A/D conversion circuit, which quantizes the processed video signals to produce video data corresponding to the respective light reception pixels of said solid-state image pickup device;
   a line memory, which stores the video data in a horizontal line unit; and
   a digital processing circuit, which performs signal processing of the video data read from the line memory to produce processed video data, said digital processing circuit operating asynchronously with said drive circuit,
   wherein the operation of said analog processing circuit and said A/D conversion circuit is synchronized with said operation of said drive circuit, said drive circuit and said analog processing circuit are operated in a predetermined period which is shorter than a horizontal scanning period at the beginning of the horizontal scanning period, and said digital processing circuit is operated during the remainder of the horizontal scanning period after completion of operations of said drive circuit and said processing circuit.

2. The image pickup apparatus according to claim 1, which further comprises
   a first timing control circuit, which controls operation timing of said drive circuit according to a reference clock with a predetermined cycle to synchronize the operation of said analog processing circuit and said A/D conversion circuit with the operation timing and stores the video data into said line memory at a timing pursuant to conformity with the reference clock; and
   a second timing control circuit, which reads the video data from said line memory asynchronously with the reference clock and controls operation timing of said digital processing circuit.

* * * * *